US005233343A

United States Patent [19]

Mazzoni

[11] Patent Number: 5,233,343

[45] Date of Patent: Aug. 3, 1993

[54] STOWING SYSTEM WITH ADJACENT LOCKERS USABLE IN PARTICULAR IN RAILWAY STATIONS OR AIRPORTS

[75] Inventor: Hélène Mazzoni, Puyricard, France

[73] Assignee: MORS, France

[21] Appl. No.: 684,022

[22] Filed: Apr. 11, 1991

[30] Foreign Application Priority Data

Apr. 11, 1990 [FR] France ................................ 90 04673

[51] Int. Cl.$^5$ ................................................ H04B 1/00

[52] U.S. Cl. ................................ 340/825.35; 221/154

[58] Field of Search ................ 235/375, 381; 194/205, 194/210, 215, 239, 247, 350; 221/5, 154; 364/464.01; 340/825.31, 825.35, 825.69, 825.72

[56] References Cited

U.S. PATENT DOCUMENTS 4,914,732 4/1990 Henderson et al. ............ 340/825.31

*Primary Examiner*—Donald J. Yusko
*Assistant Examiner*—Dervis Magistre
*Attorney, Agent, or Firm*—Ostrolenk, Faber, Gerb & Soffen

[57] ABSTRACT

A stowing system with adjacent lockers comprising a portable device allowing to dialogue with a control and operating device associated with a group of lockers through the medium of a wireless preferably infrared radiation connection so as to enable a system-running person to perform particular functions the system being applicable in left-luggage locker appliances used in particular in railway stations and/or airport terminals.

6 Claims, 2 Drawing Sheets

Fig. 1
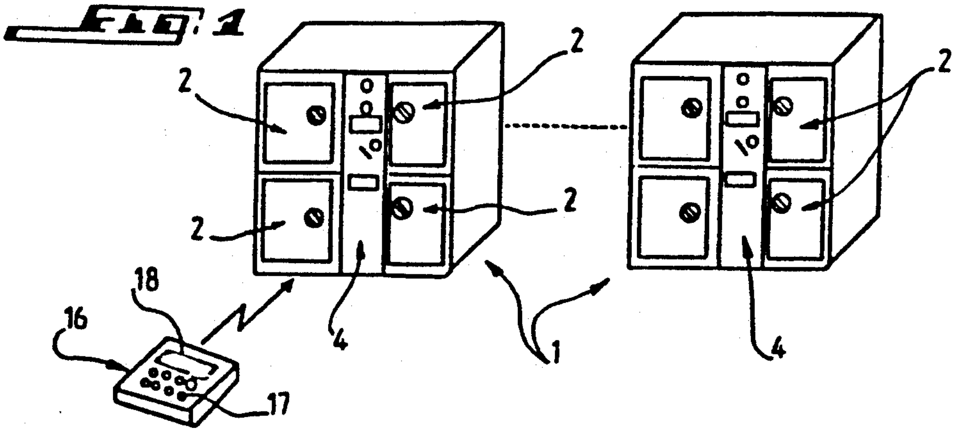
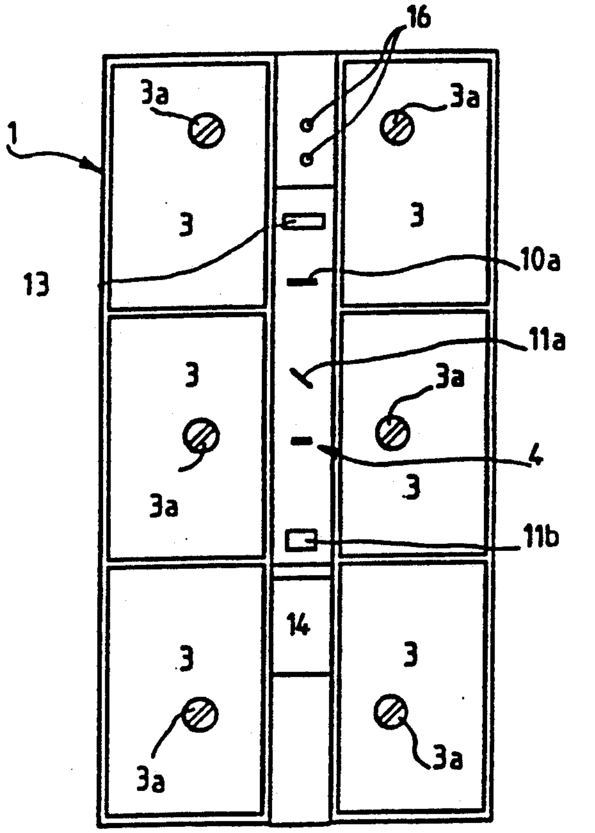
Fig. 2
Fig. 4
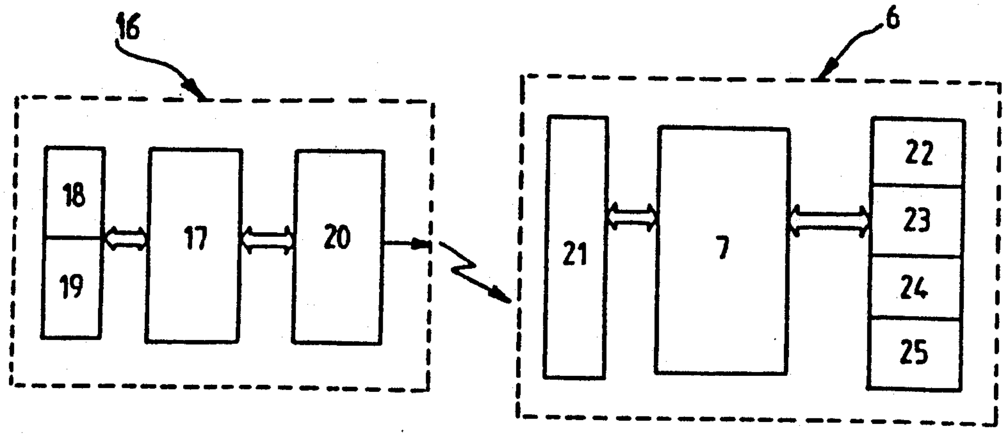

STOWING SYSTEM WITH ADJACENT LOCKERS USABLE IN PARTICULAR IN RAILWAY STATIONS OR AIRPORTS

BACKGROUND OF THE INVENTION

The present invention relates to a stowing system with adjacent lockers usable in particular in railway stations or airports and enabling any user to deposit personal objects or private things such as luggage or parcels, packages or like cases into a selected locker and to withdraw these objects therefrom before the end of a determined period of engagement or occupation of the locker.

Such systems are generally provided with a computer device connected by wire transmission means to independent groups or cabinets of locker compartments located in a railway station or in an airport terminal and allowing a system managing or running staff to have an access to various services such as the locking of a locker compartment of a chosen group or set of locker compartments, to the cash statement associated with the group of lockers, to the visual display or detection of those lockers the allowed period of engagement or occupation of which has been exceeded and so on. This known system however does not always allow to accomplish some services or some functions desired by the system running person. For instance upon the disabling of a selected locker compartment by the system running person it may happen that the door of this locker has been left ajar or half-open thereby making this disabling impossible unless the system running person directly proceeds to the place of the group of lockers where the locker to be disabled is located, mechanically locks the door of the locker and returns to the working station where the computer device is located. Moreover the installation of the wire transmission connection between the computer device and various groups of lockers is relatively expensive.

SUMMARY OF THE INVENTION

The object of the present invention is to remove the inconveniences referred to hereinabove of the known systems by providing a stowing system with adjacent lockers of the type comprising a device preferably with a microprocessor for controlling or checking operations of depositing or withdrawing at least one object into or from a locker by a user and a device preferably with a microprocessor enabling a person running the system to dialogue with the control device for accomplishing determined control and/or operating monitoring functions such as the disabling of a locker, the checking of the exceeding of the allowed period of engagement or occupation of one or several lockers, the inspection of an occupied locker, the change of the period of engagement or of the rental fee or custom rates of the lockers, the opening of all the lockers, the assessment of the total amount of the cash box receiving coins from at least one coin-mechanism, the disabling of all the lockers and the testing of the various parts of the system and characterized in that the dialogue system is portable and bidirectionally communicates with the control device by a wireless and preferably infrared radiation connection.

According to a feature of the invention the dialogue device comprises a keyboard and a display screen for visualizing functions to be accomplished after the system running person has composed on the keyboard his own code of access to the functions, the person selecting from the keyboard the desired function which is stored into the dialogue device and later conveyed in coded form to the aforesaid control device and possibly indicating by means of the keyboard a parameter required for the accomplishment of the chosen function, which parameter is stored in the dialogue device and further conveyed in coded form to the control device, wherein this parameter may for instance be the number of the locker to be locked when the function to be performed is the disabling of this locker.

According to still another feature of the invention the dialogue device is adapted to show to the system running person on the display screen after he has composed his access code the number of a group of lockers which the agent wishes to act upon and to enable him by means of the keyboard to compose this number before the display or visualization of the various possible functions takes place which number is stored into the dialogue device for later conveyance in coded form to the control device.

Advantageously the code of the number of the group of lockers, the code of the selected function to be carried out and possibly the code of the parameter required for the performance of this function are conveyed to the control device as a pack of data bits, preferably of data octets the first character of which received by the control device causes the system to be automatically tripped from the user operating mode into the operating mode of the system running person.

The control device is adapted to demodulate and to decode the data from the dialogue device and to convey to the latter a signal of acknowledgment of receipt of the data.

Moreover the control device is also adapted to process the data received from the dialogue device and to carry out the selected function and possibly to convey to the dialogue device coded data relating for instance to the numbers of the lockers the allowed period of occupation or engagement of which has been exceeded, these data being visualized on the display screen of the dialogue device.

DESCRIPTION OF THE PREFERRED EMBODIMENT

The invention will be better understood and further objects, characterizing features, details and advantages thereof will appear more clearly as the following explanatory description proceeds with reference to the accompanying diagrammatic drawings given by way of non limiting example only illustrating a presently preferred specific embodiment of the invention and wherein:

FIG. 1 shows the stowing system according to the invention;

FIG. 2 is an enlarged front view of a group of locker compartments;

Figure 3A:
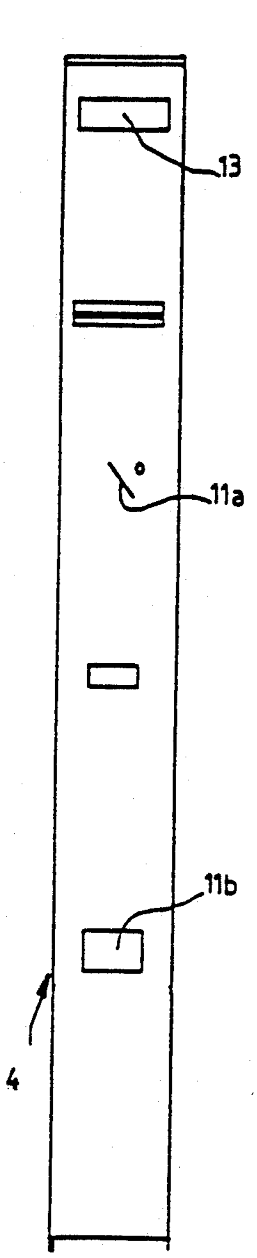
FIG. 3A is a front view of a technical module associated with a group of lockers.
Figure 3B:
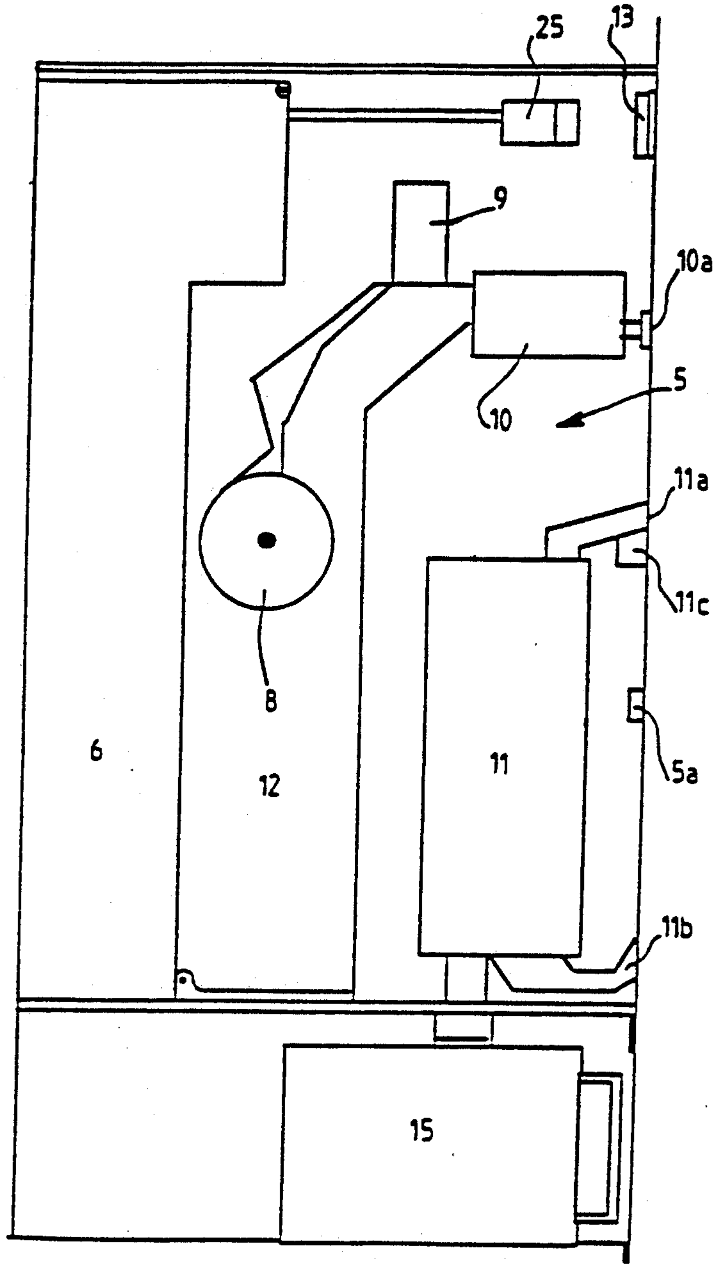

FIG. 3B diagrammatically shows the inside of of the technical module; and

FIG. 4 diagrammatically shows the electronic devices allowing the dialogue between a system running person, agent or attendant and a group of lockers for the performance of particular selected functions.

Referring to the figures the stowing system comprises several groups or cabinets 1 of lockers 2, two groups only having been shown for the sake of simplicity and the doors of which in their closed positions are lying side by side while extending substantially in a same front plane. With each group 1 of lockers 2 is associated a technical module 4 arranged between two adjacent columns of lockers and generally controlling operations such in particular as the deposit or withdrawal by a user of an object into or from a locker chosen by the user. More specifically the technical module 4 comprises an upper drawer 5 mainly containing an electronic box or casing 6 including a device 7 preferably with a microprocessor in particular controlling the deposit and withdrawal operations and several parts consisting of a supply of tickets 8 having magnetic tracks and formed of a wound cardboard tape, a device 9 for printing determined data onto one tape section forming a ticket and for severing or cutting off this section, a device 10 allowing to encode onto the magnetic track of a ticket particular data and to read out these data, a coin-operated device 11 with a slot 11*a* for the insertion of coins, a refunding pan 11*b* and a shutter 11*c* for closing the slot 11*a*, a ticket recovery or collecting bin 12 and a data visualizing display screen 13. The drawer 5 upon unlocking of a lock is movable in a plane extending at right angles to that of FIG. 2 so as to provide access to the various devices included in the drawer 5. The technical module 4 also comprises a flap door 14 which upon unlocking of its lock allows the withdrawal of the coin collecting cash box 15.

The principle of operation of the system in the customer mode described hereinabove is the following.

For depositing luggage the user selects an available locker compartment 3 from indications given by signal lights or indicator lamps 16 of the drawer 5, deposits into the locker compartment his luggage, closes the door of the selected locker compartment and mechanically locks it by turning the button 3*a*. The shutter 11*c* closing the coin-insertion slot 11*a* opens and the user inserts the exact sum to pay the rental price or fee shown by the dialogue display means 13. Once the price has been correctly paid a tape section of the supply 8 is driven by the device 9 which prints visible data and severs or cuts off the tape section to form a ticket. The ticket then passes into the encoder-read out device 10 so as to encode onto its magnetic track data necessary for the withdrawal of luggage and in particular comprising the number of the place where the system is located, the number of the column or vertical row, the number of the locker compartment, the date, the time, a random code or any other useful information. The visible data printed onto the side opposite from that of the magnetic track of the ticket may for instance be the direction of insertion of the document, the instructions for use, the date, the time, the number of the place where the system is located, the number of the column or vertical row and the number of the locker. For checking the proper encoding of the magnetic document the latter is read again by the device 10 before the issuance of the document to the user. In case of a defect upon reading the ticket again and after a re-write test the ticket is thrown into the receiver bin 12 and a new ticket is written out. When the deposit operating step has been properly performed the control device 7 electromechanically locks the locker 3. Electromechanical locking mechanisms are known per se and may consist for instance of electromechanical members for actuating lock bolts or of electric motors the directions of activation of which would determine the locking and the unlocking of the lock.

To withdraw his luggage the user would insert his magnetic ticket into the encoder-read out device 10 through the slot 10*a* according to the direction stated on the ticket. The data written or recorded on the magnetic track of the ticket are read out by the device 10 and checked by the control device 7. If the ticket is valid the device 7 conveys a command signal for operating the opening of the corresponding locker and requests the user through the display device 13 to withdraw his luggage. In case of an invalid ticket for instance when the set period of occupation of the locker has been exceeded and when the attendant has put the locker in service again the display device 13 would request the user to proceed to the left-luggage office or to report to the position of an attendant to recover his luggage there, this request being effected in the same manner for instance when a locker would have been disabled, i.e. its use forbidden. Likewise any anomaly detected or sensed during the withdrawal of luggage is pointed out to the user through the medium of the display system 13.

According to the invention the system moreover comprises a portable device or terminal 16 allowing a bidirectional dialogue with the control device 7 through a wireless preferably infrared radiation connection. The device 16 comprises a microprocessor 17 connected to a keyboard 18 and to a display screen 19 for visualizing various functions to be performed upon the request of the person or agent running the system. The microprocessor 17 is bidirectionally connected to a unit 20 for sending out or emitting and receiving coded information towards the control device 7 of the box or casing 6 and from the latter. The unit 20 comprises as already known per se a modulator allowing the modulation of the current flowing through the infrared radiation emitting LED-diode by coded data signals and a demodulator for the coded data signals coming from the device 6. The device 7 is also bidirectionally connected to a unit 21 for receiving and emitting coded data signals which is like the unit 20 and through the medium of interface circuits (not shown) to various parts of the system such for instance as the electromechanical means 22 for locking or unlocking the locks of locker doors, means 23 for checking the proper closing of a locker door and consisting for instance of an opto-electronic sensor or pickup associated with the lock of the door of the selected locker, to switches 24 for detecting or sensing the breaking in of the cash box 15 and/or of the technical module 4 and a warning or alarm hooter 25, this list being not limiting.

The devices 7 and 17 are of course adapted to encode and decode the data to be conveyed and to be received. Moreover the technical drawer 5 comprises a LED infrared radiation emitter-receiver unit 5*a* as well besides as the device 16, the emitter-receiver unit 5*a* being connected to the microprocessor 7 via the unit 21 whereas the emitter-receiver unit of the device 16 is connected to the microprocessor 17 via the unit 20.

In order to be able to have access to the various functions of the system running person the latter would compose at first his own code by means of the keyboard 18 and the microprocessor 17 is adapted to ask the system running person on the display screen 19 the number of the group of lockers upon which he wishes to act upon. The system running person would then compose by means of the keyboard 18 the number of the group of lockers which is stored in coded form in a (RAM) memory of the microprocessor 17. Once this number has been composed, the system running person sees the appearance on the screen 19 of a list of functions likely to be selected by that person. Thus in the case where the system running person is an attendant or agent these functions may comprise the checking of the time, the time setting, the visualizing or display of the lockers the set periods of occupation of which have been exceeded, the disabling of a locker, the re-enabling of a locker, the mere inspection of a locker, the generalized opening of the lockers, the information about the contents of the cash box, the visual display of anomalies and the disabling of groups of lockers. The agent then would select by means of the keyboard 18 the desired function which is stored in the microprocessor device 17 and if necessary indicates by means of the keyboard 18 a parameter required for the performance of the selected function, this parameter being also stored in the device 17. Then the number of the group of lockers, the code of the selected function to be accomplished and possibly the code of the parameter necessary for the performance of this function are conveyed by the unit 20 to the unit 21 which would demodulate the received infrared radiation signal so as to allow the microprocessor 7 to decode the information received. According to the type of information received the microprocessor 7 either carries merely out a commande related to the desired function or conveys to the device 16 information also related to the desired function. It should however be noted that the microprocessor device 7 is also adapted to convey a signal of acknowledgment of receipt to the device 16 at every information message received. The coded data relating to the number of the group of lockers, to the selected function and to the parameter are conveyed to the microprocessor device 7 as a pack of data bits preferably of data octets the first bit or character of which received by the device 7 causes the system to be automatically tripped from the user operating mode to the agent operating mode.

Assuming an attendant to be the system-running person examples will be given herebelow in order to make the principle of operation of the invention better understandable.

When the attendant wishes to check the time after having composed his access code he would convey this function to the microprocessor device 7 of the assigned group of lockers. The microprocessor device 7 would then merely convey to the device 16 its date and its time which are appearing on the screen 19. The time-set function will enable the attendant to change the date and the time of each group of lockers when changing for instance from winter time to summer time by conveying to the device 7 the data relating to the new date and time which are then visualized on the display device 13 for checking purposes. When the attendant calls for the visual display of the lockers the duration of occupation of which has been exceeded the device 7 would convey to the device 16 the numbers of the lockers involved while visualizing on the display screen 19 lockers the duration of deposit of which exceeds the allowed duration. When the overall opening of the lockers is called for the device 16 after receiving data relating to this function would command to operate the opening of the lockers one by one. After having sent out the operating order relating to the cash box data function the device 16 receives the useful information from the device 7 relating to the cash box (total amount of money in the cash box, number of coins by coin types) and the number of occupations of each locker. For the visual display of anomalies upon the receipt of this operating order the device 7 would send to the device 16 the list of anomalies it has stored. If there is no anomaly the device 7 will answer by a simple acknowledgment of receipt.

The functions which have to be performed by the conveyance of a parameter are the disabling of a locker, the putting of a locker again into service and the simple inspection of a locker.

For disabling a locker after having chosen this function by the keyboard 19 the parameter to be conveyed is the number of the locker to be disabled. Once the device 7 has received this information it requests the attendant through the medium of the display device 13 to close the door of the locker to be disabled and once this operating step has been carried out the microprocessor device 7 conveys a command signal for operating the locking of the lock of the locker: the disabling of the locker may also be effected with the door left open (in the case where the lock has been damaged). As soon as the locker has been disabled the system leaves the attendant operating mode. Any occupied locker may of course be put out of use with its door being closed. In such a situation upon reading out the ticket inserted by the user into the slot 10*a* the device 7 would operate the display on the display device 13 of a message requesting the user to apply or report to the position of the attendant.

For enabling a locker again the parameter to be conveyed also is the number of the locker. Upon the receipt of this operating order the device 7 would operate the opening of the locker involved and cause the system to leave the agent operating mode. If the locker is occupied the corresponding ticket has nevertheless to be recognized and the device 7 causes the device 13 to display a message requesting the user to proceed to the position of the attendant or left-luggage office.

For effecting an inspection of a locker the attendant would indicate as a parameter the number of the locker. Upon the receipt of this information the device 7 operates the opening of the locker and a determined time of two minutes for instance is available to the attendant to close the door of the locker whereupon a sound alarm is released. If the locker has been closed in due time the operation is fully transparent to the user.

Hereinabove an attendant as a system-running person has being referred to but it should be understood that the device 16 is also usable by any other system-running persons such as a managing agent, a maintenance or servicing agent and a cashier. In the case of a cashier the latter would compose the number of the group of lockers where the cash box to be checked is located and thereafter his access code. The device 7 would reply by conveying to the device 16 the information relating to the cash box (total amount of money contained therein and detailed specification by types of coins) and to the number of occupations of the lockers, which information is visualized on the display screen 19. At the end of this transmission the device 7 causes an accounting ticket to be issued for the cashier once the ticket is withdrawn and following the withdrawal of the cashbox 15 a determined period of time for instance of 2 minutes is available to the cashier for enabling him to put the cash box back into position otherwise an alarm would be released. At the end of the operation the device 7 would re-initialize the information relating to the cashbox. When the system-running person is a managing agent the latter after having composed his secret code would have access to the various functions mainly comprising the change of rental fees or price rates of the lockers, the change of the manager code, the change of the period of occupation of the lockers and the disabling of one or several groups of lockers. These functions need not to be further described in detail and are accomplished in the same manner as the functions performed by the attendant. At last when the system-running person is a maintenance or service agent the latter after having composed on the keyboard 18 his secret code has access to functions of testing electronic component members of the system and comprising for instance the test of the lock bolt—clasps of the lockers, the test of the device for the distribution and receiving of the document by the bin 12, the test of the coin mechanism 11, the test of the display device 13, the test of the signal lights 16, the test of the alarm hooter 25 and other tests. The maintenance agent should also have access to all the aforesaid functions in the system-running person operating mode other than the test functions.

The above list of the various functions to which the attendant, the cashier, the maintenance agent and the manager agent may have access is of course not limiting; other functions may be provided without departing from the scope of the present invention.

The system according to the invention therefore provides a great flexibility to the management thereof by a system-running person which thus may directly converse with the various groups of lockers. The softwares required for performing the aforesaid functions are obvious to anybody skilled in the art upon taking into account the description thereof made hereinbefore and it is therefore not necessary to disclose their operating block diagrams.

What is claimed is:

1. A stowing system having adjacent lockers comprising a control device with a microprocessor for controlling operations of depositing or withdrawal of at least one object into or from one locker by a user and a dialogue conducting device with a microprocessor enabling a system operating person to conduct a dialogue with the control device for accomplishing determined control or operating functions including disabling a locker, checking the allowed duration of occupation of one or several lockers, inspection of an occupied locker, change of duration of occupation and rental price of the lockers, opening of all the lockers, assessment of the total amount of money in a cash box receiving coins from at least one coin mechanism, disabling all the lockers and testing parts of the system, wherein the dialogue conducting device is portable, bidirectionally communicates with the control device by a wireless connection, and includes a keyboard and a display screen for visualizing functions to be accomplished after the system-operating person has entered on the keyboard an access code to the functions, the system-operating person selecting through the keyboard the desired function which is stored in the dialogue conducting device and later conveyed in coded form to the control device and indicating by means of the keyboard one parameter required for the performance of the selected function, which parameter is stored in the dialogue device and later conveyed in coded form to the control device, said parameter being the number of a locker to be disabled when the function to be carried out is the disabling of said locker, said system further comprising a plurality of independent groups of lockers each controlled by a control device, and the dialogue conducting device is adapted to ask the system-operating person on the display screen after the person has entered the access code the number of that group of lockers which the system-operating person wishes to act upon to enable the person by means of the keyboard to enter the number before the occurrence of the display of the various possible functions, which number is stored in the dialogue device for later conveyance in coded form to the control device of the selected group of lockers, and wherein the code of the number of the group of lockers, the code of the parameter necessary to the performance of this function are conveyed to the control device as a pack of data bits, the first character of which received by the control device causes the system to be automatically tripped from the user operating mode to the system-operating person operating mode.

2. A system according to claim 1, wherein the control device is adapted to demodulate and to decode the information coming from the dialogue device and to convey to the latter a signal of acknowledgement of receipt of the information.

3. A system according to claim 1, wherein the control device is also adapted to process the information received from the dialogue device and to carry out the selected function and to convey to the dialogue device coded information relating to the number of the locker the allowed period of occupation of which has been exceeded, this information having been displayed on the display screen of the dialogue device.

4. A system according to claim 1, wherein said wireless connection is a wireless infrared radiation connection.

5. A system according to claim 1, wherein said data bits are data octets.

6. A storing system having adjacent lockers comprising a control device with a microprocessor for controlling operations of depositing or withdrawal of at least one object into or from one locker by a user and a dialogue conducting device with a microprocessor enabling a system-operating person to conduct a dialogue with the control device for accomplishing determined control or operating functions including disabling a locker, checking the allowed duration of occupation of one or several lockers, inspection of an occupied locker, change of duration of occupation and rental price of the lockers, opening of all the lockers, assessment of the total amount of money in a cash box receiving coins from at least one coin mechanism, disabling all the lockers and testing various parts of the system, wherein the dialogue conducting device is portable, bidirectionally communicates with the control device by a wireless connection, and includes a keyboard and a display screen for visualizing functions to abe accomplished after the system-operating person has entered on the keyboard an access code to the functions, the system-operating person selecting through the keyboard the desired function which is stored in the dialogue conducting device and later conveyed in coded form to the control device and wherein the code of the selected function to be accomplished is conveyed to the control device as a pack of data bits, the first character of which received by the control device causes the system-operating person operating mode.

* * * * *